United States Patent
Norton et al.

(10) Patent No.: US 11,144,643 B1
(45) Date of Patent: *Oct. 12, 2021

(54) FUNCTIONAL LANGUAGE SOURCE CODE VULNERABILITY SCANNER

(71) Applicant: State Farm Mutual Automobile Insurance Company, Bloomington, IL (US)

(72) Inventors: Joseph W. Norton, Normal, IL (US); Michael Gregory Schwarz, Bloomington, IL (US); Paul David Kimbrel, Wylie, TX (US); William Knight Harrod, Dallas, TX (US); Matthew Joshua Tijerina, Richardson, TX (US); Kevin Knipmeyer, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 61 days.

This patent is subject to a terminal disclaimer.

(21) Appl. No.: 16/830,350

(22) Filed: Mar. 26, 2020

Related U.S. Application Data

(63) Continuation of application No. 15/724,640, filed on Oct. 4, 2017, now Pat. No. 10,628,584.

(51) Int. Cl.
*G06F 21/56* (2013.01)
*G06F 11/36* (2006.01)

(52) U.S. Cl.
CPC ........ *G06F 21/563* (2013.01); *G06F 11/3604* (2013.01); *G06F 2221/033* (2013.01)

(58) Field of Classification Search
CPC .............. G06F 11/3604; G06F 21/563; G06F 2221/033
See application file for complete search history.

(56) References Cited

U.S. PATENT DOCUMENTS

| | | | |
|---|---|---|---|
| 9,594,754 B2 * | 3/2017 | Gounares | ............ G06F 11/3616 |
| 9,792,443 B1 | 10/2017 | Sheridan et al. | |
| 2007/0234288 A1 | 10/2007 | Lindsey et al. | |

(Continued)

OTHER PUBLICATIONS

Jay-Evan J. Tevis and John A. Hamilton, Jr., Static Analysis of Anomalies and Security Vulnerabilities in Executable Files, ACM, 2006, retrieved online on Dec. 12, 2019, pp. 560-565. Retrieved from the Internet <URL:http://delivery.acm.org/10.1145/1190000/1185570/p560-tevis.pdf?>. (Year: 2006).

*Primary Examiner* — Hanh Thi-Minh Bui

(57) ABSTRACT

A code scanning system has a syntax generation component that receives source code and generates an abstract syntax tree file. The system includes a white list of permitted pure functions, and a black list of prohibited impure functions. In addition, the system includes a static code analyzer for performing static analysis of the source code. The static code analyzer includes a function analyzer that receives the AST file and identifies the functions. Each function is compared to the white list, and if it is present, marked as permitted in a static analysis file. If the function is not on the white list, it is compared to the black list. If it is present on the black list, it is marked as prohibited in the static analysis file. If the function is not on the white or black list, it is marked as "unknown" and subjected to manual analysis.

20 Claims, 4 Drawing Sheets

(56) References Cited

U.S. PATENT DOCUMENTS

| | | |
|---|---|---|
| 2015/0207811 A1 | 7/2015 | Feher et al. |
| 2016/0203313 A1 | 7/2016 | El-Moussa et al. |
| 2017/0169229 A1* | 6/2017 | Brucker ................ G06F 21/566 |
| 2019/0311133 A1 | 10/2019 | Sheridan et al. |

* cited by examiner

FUNCTIONAL LANGUAGE SOURCE CODE VULNERABILITY SCANNER

CROSS-REFERENCE TO RELATED APPLICATIONS

This application is a continuation of U.S. patent application Ser. No. 15/724,640, titled "FUNCTIONAL LANGUAGE SOURCE CODE VULNERABILITY SCANNER," filed Oct. 4, 2017, the entire disclosure of which is hereby expressly incorporated by reference herein in its entirety.

BACKGROUND

Embodiments of the invention relate generally to systems and techniques for analyzing computer code, and more particularly, to systems and techniques for determining whether computer code contains impure functions that may leave underlying data vulnerable to known security risks.

Insurance companies and other data-driven businesses use various types of customer information to generate cost estimates and/or quotations for services. For example, an insurance company may gather a prospective customer's demographic information (name, age, residence, etc.) as well as additional information, and then perform an actuarial analysis of the prospective customer based on this information to generate cost estimates. In addition, when offering a new service or business product, an analysis of proprietary historical data may be performed.

In some instances, actuaries or employees of the business have a need to run calculations on large amounts of the businesses' proprietary data related to a particular business product, and such data may be stored in various internal databases. In one example, to accomplish such an analysis, an employee utilizing a programming language creates calculation instructions via a computer program. Generally, source code is specified or edited by the employee manually and/or with help of an integrated development environment (IDE) comprising numerous development services (e.g., editor, debugger, auto fill, intelligent assistance, etc.). The employee may choose to implement source code utilizing, for example, a functional programming language such as Clojure, Lisp, or the like. Subsequently, the source code may be compiled or otherwise transformed to facilitate execution by a computer or like device.

Unfortunately, the computer programs written by the businesses' employees may change the underlying proprietary data and/or may contain input/output (I/O) calls to functions outside the business product environment that have unintended side effects and/or data vulnerabilities. That is, the computer programs may contain one or more functions that rely on changing data and/or external input from I/O devices, and/or change the underlying proprietary data.

To alleviate the above concerns, the computer programs may be assessed using traditional static testing of the source code for programming patterns that could be vulnerable to security threats. However, typical security-analysis techniques are performed by comparing the functional programming language source code of the computer program against a hypothetical set of uniform security standards. Such security standards typically address finding security weaknesses and vulnerabilities in the application itself. In addition, the existing security-analysis techniques fail to adequately identify whether the source code may change the underlying businesses proprietary data and/or may contain input/output (I/O) calls to functions outside the business product environment that may leave the proprietary data vulnerable.

BRIEF DESCRIPTION OF THE INVENTION

In one aspect, a code scanning system for scanning source code for data vulnerabilities is provided. The system includes a code scanning computing device having a syntax generation component that receives the source code and generates an abstract syntax tree (AST) file including a data structure representing the source code. The code scanning computing device also includes a memory device including a white list having a list of predetermined pure functions permitted for use in the source code and a black list having a list of predetermined impure functions prohibited for use in the source code. In addition, the code scanning computing device includes a static code analyzer for performing a static analysis of the source code. The static code analyzer includes a function analyzer that receives the AST file from the syntax generation component. The function analyzer also evaluates the AST file to identify one or more functions of the source code. Moreover, the function analyzer compares each function of the one or more functions to the white list, and if the function is on the white list, marks the function as permitted in a static analysis file. Furthermore, the function analyzer compares each function of the one or more functions to the black list if the function is not on the white list, and if the function is on the black list, marks the function as prohibited in the static analysis file.

In another aspect, a computer-implemented method for determining whether source code contains impure functions is provided. The method includes receiving the source code and performing a static analysis of the source code. The static analysis includes identifying one or more functions of the source code; comparing each function of the one or more functions to a white list, and if the function is on the white list, classifying the function as a pure function; and comparing each function of the one or more functions to a black list if the function is not on the white list, and if the function is on the black list, classifying the function as an impure function.

In yet another aspect, one or more computer-readable media having computer-executable instructions is provided. Upon execution by a processor, the computer-executable instructions cause the processor to perform operations including receiving source code and performing a static analysis of the source code. The static analysis includes identifying one or more functions of the source code; comparing each function of the one or more functions to a white list, and if the function is on the white list, classifying the function as a pure function; and comparing each function of the one or more functions to a black list if the function is not on the white list, and if the function is on the black list, classifying the function as an impure function. In addition, the computer-executable instructions cause the processor to perform operations including writing the results of the static analysis of the source code to a static analysis file.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DRAWINGS

The Figures described below depict various aspects of devices and methods disclosed therein. It should be understood that each Figure depicts an embodiment of a particular aspect of the disclosed devices and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. The drawings are not necessarily to scale, emphasis instead being placed upon clearly illustrating the principles of the embodiments of this disclosure.

DETAILED DESCRIPTION

The following detailed description of embodiments of the disclosure references the accompanying drawings. The embodiments are intended to describe aspects of the disclosure in sufficient detail to enable those skilled in the art to practice the disclosure. Other embodiments can be utilized and changes can be made without departing from the scope of the claims. The following detailed description is, therefore, not to be taken in a limiting sense. The scope of the present disclosure is defined only by the appended claims, along with the full scope of equivalents to which such claims are entitled.

The present embodiments described in this disclosure and other possible embodiments address the need for static testing of source code for pure and impure functions, and more specifically, for static testing source code implemented in a functional programming language such as Clojure.

Embodiments of the present invention include a code scanning computing device coupled to a business product computing device. The code scanning computing device receives the source code from the business product computing device performs a static analysis of the source code. The source code is parsed and evaluated to identify the functions contained therein. The functions are compared to a white list and a black list and marked as permitted, prohibited, or unknown. In an embodiment, the code scanning computing device writes the results to an analysis file and stores and/or distributes the analysis file.

Exemplary Code Scanning System

Figure 1:
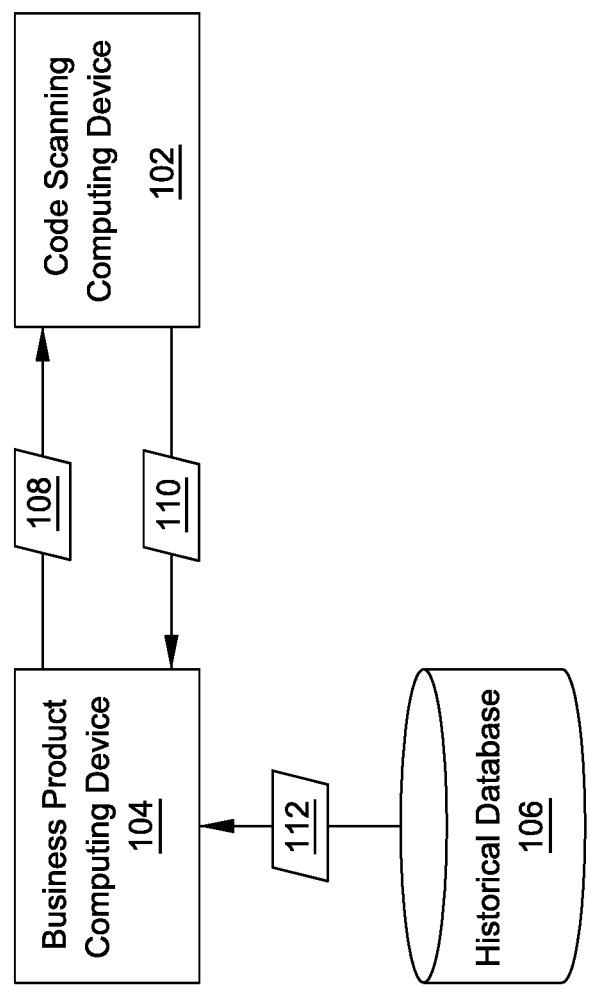
FIG. 1 is a schematic of a code scanning system for scanning source code for data vulnerabilities.

FIG. 1 is a schematic of a code scanning system 100 for scanning source code for data vulnerabilities. In the exemplary embodiment, code scanning system 100 may include a code scanning computing device 102, a business product computing device 104, and/or a historical database 106. In other embodiments, the code scanning system 100 may include additional, fewer, or alternative devices, including those described elsewhere herein. The computing devices illustrated in FIG. 1 may be conventional computing devices, although other embodiments may have different configurations, architectures, and/or components.

The components illustrated in FIG. 1 are shown as functional components of the code scanning system 100. In some embodiments, the individual components may be a hardware component, a software component, or a combination of hardware and software components. Some of the components may include application level software, while other components may be execution environment level components. It is contemplated that two or more of the components may operate on a single hardware platform. In other some suitable embodiments, the connections between the components may be made over a network connection. Each embodiment described herein may use different combinations of hardware, software, and interconnections to achieve the methods and/or techniques described herein.

The code scanning computing device 102 may be coupled in communication to the business product computing device 104 and the historical database 106, and may be configured to perform static analysis of source code 108 received from the business product computing device 104 as described herein. The source code 108 may be part of a business project being developed by a user of the business product computing device 104.

In the exemplary embodiment, the code scanning computing device 102 may be a server computing device. In alternative embodiments, the code scanning computing device 102 may include, without limitation, a conventional desktop computing device, a laptop computing device, a netbook computing device, a tablet or slate computing device, a wireless handset, a cellular telephone, a game console, or any other type of computing device.

The business product computing device 104 may be associated with, for example, and without limitation, an insurance provider and/or another party associated with insurance policies. In one embodiment, the business product computing device 104 may be associated with an insurance business product (not shown) of the insurance provider. The business product may be any type of product, such as an insurance service and/or data analytics or calculations. In some suitable embodiments, the code scanning system 100 may include two or more business product computing devices 104 coupled in communication to the code scanning computing device 102. In the exemplary embodiment, the business product computing devices 104 is configured to receive and/or transmit data associated with, for example, and without limitation, the source code 108 and the static analysis file 110 of the source code 108. The business product computing device 104 may include, without limitation, a conventional desktop computing device, a server computing device, a laptop computing device, a netbook computing device, a tablet or slate computing device, a wireless handset, a cellular telephone, a game console, or any other type of computing device.

A user (e.g., a coder, developer, or programmer) may utilize the business product computing device 104 to create the source code 108, which includes text-based files containing computer instructions for accessing historical database 106 and/or performing calculations on the data stored therein. Thus, the business product computing device 104 may include, for example, text editing or word processing software that enables the user to create the source code 108.

Historical database 106 may be configured to store historical data 112 associated with, for example, and without limitation, customers' demographic information, customers' insurance claim history, reported damage incidents for one or more insured items, and/or any relevant data for the associated business product. In the exemplary embodiment, the historical database 106 may be coupled in communication to the business product computing device 104 to transmit and/or receive the historical data 112. In some embodiments, the historical database 106 may be configured to receive historical data 112 from a different data source (not shown). In the exemplary embodiment, the business product computing device 104 may be configured to retrieve the historical data 112 from historical database 106 and generate, for example, and without limitation, a damage model based upon the historical data 112, perform calculations and/or statistical analysis on the historical data 112, and/or other data analysis actions on the historical data 112.

Exemplary Computing Device

Figure 2:
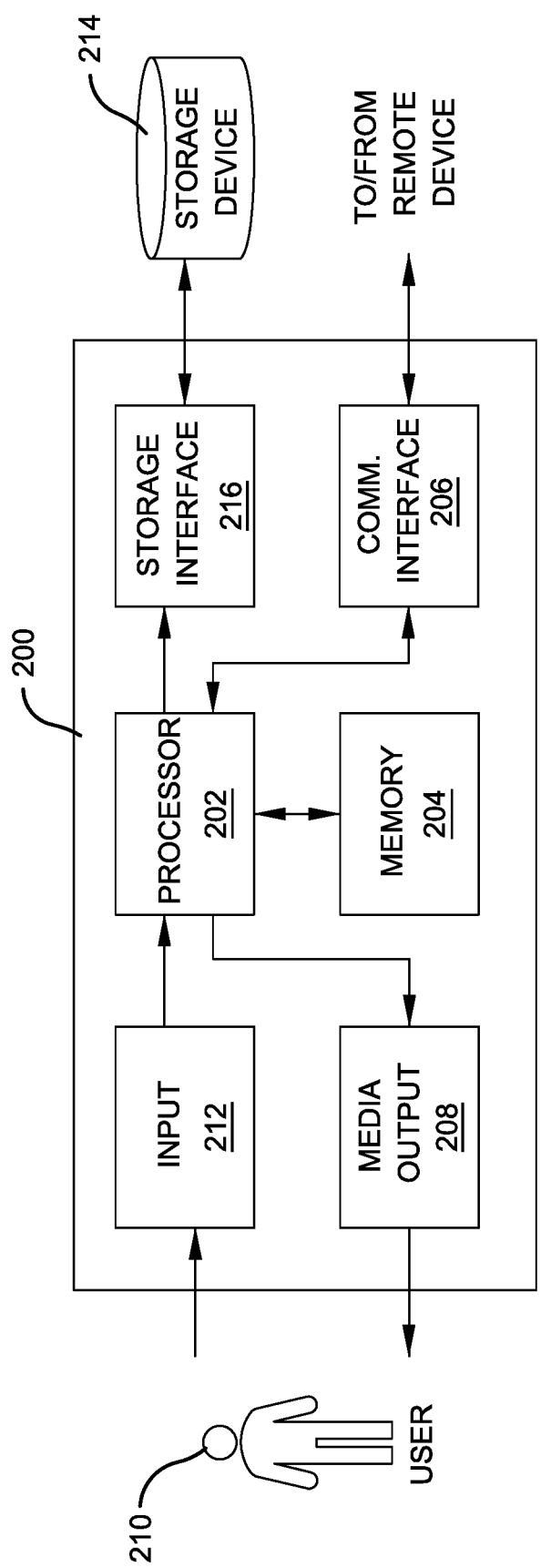
FIG. 2 is a schematic of an exemplary computing device that may be used with the code scanning system shown in FIG. 1.

FIG. 2 is a schematic of an exemplary computing device 200. The computing device 200 may include, but is not limited to, the business computing device 104 and/or the code scanning computing device 102 (each shown in FIG. 1). The computing device 200 may include a processor 202 for executing instructions. The instructions may be stored in a memory 204. The processor 202 may include one or more processing units (e.g., in a multi-core configuration). The processor 202 may be operatively coupled to a communication interface 206 such that the code scanning computing device 102 is capable of communicating with one or more remote devices, such as the business product computing device 104, the code scanning computing device 102, and/or another computing device (not shown), for example, using wireless communication or data transmission over one or more radio links or digital communication channels. For example, in some embodiments, the communication interface 206 may transmit or receive the source code data 108 (shown in FIG. 1) and/or the static analysis file 110 (shown in FIG. 1) of the source data 108.

The memory 204 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, and/or combinations thereof. In some embodiments, the memory 204 may be embedded in, or packaged in the same package as, the processor 202. The memory 204 may include, or may constitute, a "computer-readable medium." The memory 204 may store the instructions, code, code segments, software, firmware, programs, applications, apps, services, daemons, or the like that are executed by the processor 202. The memory 204 may also store settings, data, documents, databases, system logs and the like.

The computing device 200 may also include at least one media output component 208 for presenting information to, for example, a user 210. The media output component 208 may be any component capable of conveying information to the user 210. In some embodiments, the media output component 208 may include an output adapter (not shown) such as a video adapter and/or an audio adapter. The output adapter may be operatively coupled to the processor 202 and operatively coupleable to an output device such as a display device (e.g., a cathode ray tube (CRT), liquid crystal display (LCD), light emitting diode (LED) display, organic LED (OLED), or "electronic ink" display) and/or an audio output device (e.g., a speaker or headphones). In some embodiments, the media output component 208 may be configured to present a graphical user interface (e.g., a web browser and/or a client application) to the user 210. A graphical user interface may include, for example, an interface for viewing prompts, status messages, and the like.

In some embodiments, the computing device 200 may include an input device 212 for receiving input from the user 210. The input device 212 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of the media output component 208 and the input device 212.

Furthermore, in some embodiments, the processor 202 may be operatively coupled to a storage device 214 via a storage interface 216. The storage interface 216 may be any component capable of providing the processor 202 with access to the storage device 214. The storage interface 216 may include, for example, and without limitation, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access the to the storage device 214.

The storage device 214 may be any computer-operated hardware suitable for storing and/or retrieving data, such as, but not limited to, data associated with the business product computing device 104 and the historical database 106 (shown in FIG. 1). In some embodiments, the storage device 214 may be integrated into, for example, the business product computing device 104 or the code scanning computing device 102. For example, the computing device 200 may include one or more hard disk drives or other memory component that functions as the storage device 212.

In some embodiments, the storage device 214 may be external to the computing device 200 and may be accessed by one or more computing devices, such as the code scanning computing device 102 and/or the business product computing device 104. For example, the storage device 214 may include a storage area network (SAN), a network attached storage (NAS) system, and/or multiple storage units such as hard disks and/or solid-state disks in a redundant array of inexpensive disks (RAID) configuration.

The processor 202 may execute computer-executable instructions for implementing aspects of the disclosure. In some embodiments, the processor 202 may be transformed into a special purpose microprocessor by executing computer-executable instructions or by otherwise being programmed. For example, the processor 202 may be programmed with instructions such as those illustrated in FIG. 4.

Exemplary Code Scanning Computing Device

Figure 3:
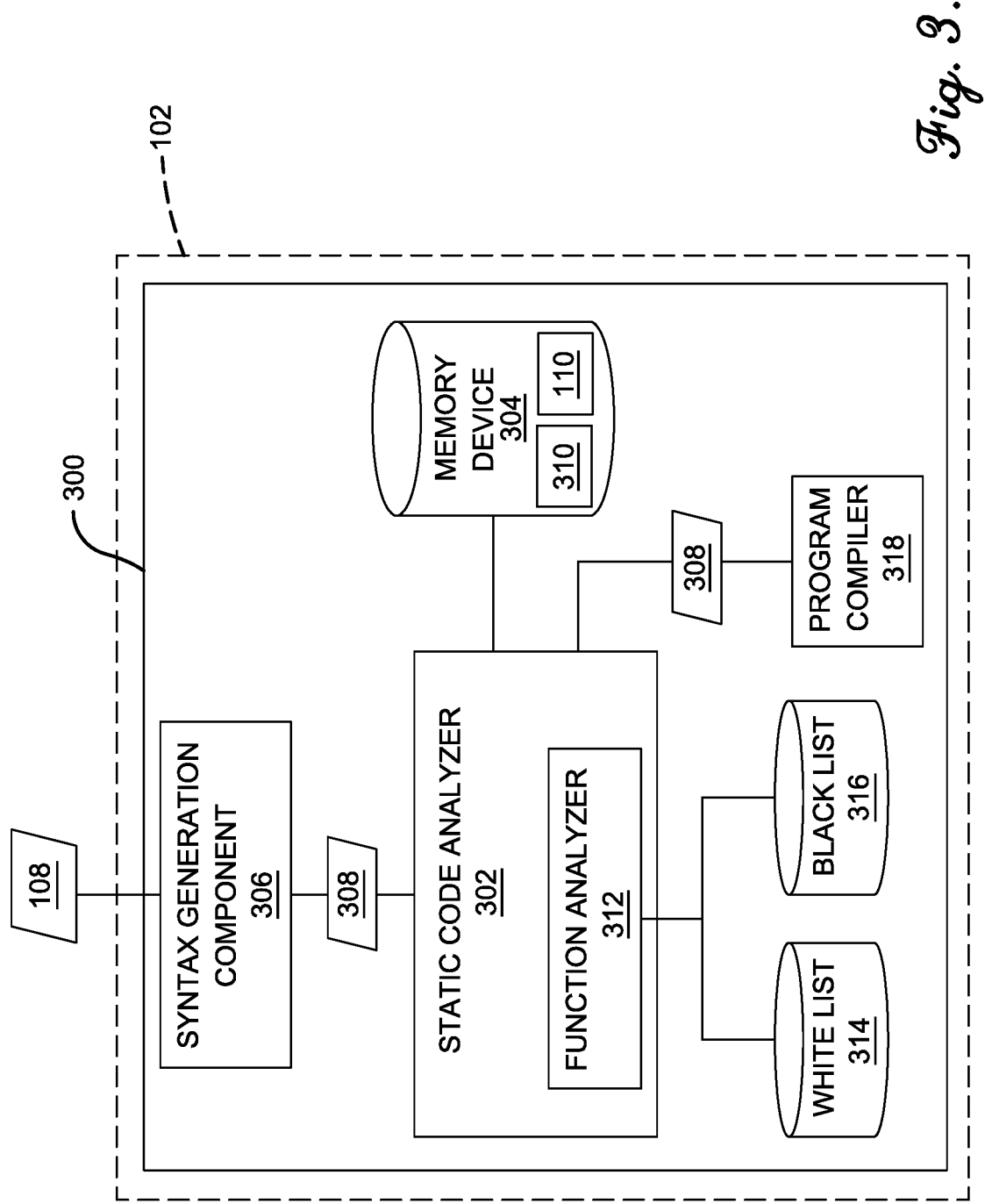
FIG. 3 is a schematic of software components of a code scanning computing device of the code scanning system of FIG. 1, and for performing a static analysis of the source code.

FIG. 3 is a schematic of software components 300 of the code scanning computing device 102 for performing the static analysis of the source code 108. The software components 300 may be executed by a processor, such as the processor 202 (shown in FIG. 2). In the exemplary embodiment, the code scanning computing device 102 may be configured to receive the source code 108 from the business product computing device 104 (shown in FIG. 1). The source code 108 may be analyzed using a static code analyzer 302. The static code analyzer 302 may analyze the source code 108 and classify the functions of the source code 108 as pure functions and impure functions. The static code analyzer 302 may store the results of the static analysis in the static analysis file 110, as well as other data described herein, in a memory device 304. The memory device 304 may include electronic hardware data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, and/or combinations thereof.

As used herein, the term "pure function(s)" includes a function where the resultant value does not depend on any hidden information or state that may change while the program execution proceeds or between different executions of the program, nor does it depend on any external input from input/output (I/O) devices. In addition, the evaluation of the result does not cause any semantically observable side effect or output, such as mutation of mutable objects or output to I/O devices. That is, a pure function may not change the underlying businesses proprietary data and/or contain input/output (I/O) calls to functions outside the business product environment that have unintended side effects and/or data vulnerabilities. In contrast, the term "impure function" includes functions that may rely on outside or changing data and/or external input from I/O devices, and/or change the underlying proprietary data.

While described herein as performing static analysis on the source code 108, it is contemplated that the code scanning computing device 102 may perform static analysis on the source code 108, intermediate code, object code, decompiled code, machine code, or any other software form. In addition, in some embodiments, the static code analyzer 302 may operate as part of a program compiler 318.

The code scanning computing device 102 also includes a syntax generation component 306 that receives at least a portion of a computer program, such as the source code 108, and generates a code representation 308 of the source code 108, which may be, for example, and without limitation, an abstract syntax tree (AST) representation. The term "abstract syntax tree" includes a data structure representing the source code 108 that has been parsed, from which code generation may be performed. An AST file 310 storing the AST representation may be created and stored in the memory device 304. The syntax generation component 306 may be implemented in whole or in part by a program compiler 318 selected based on, among other things, the programming language in which the source code 108 is written. Alternatively, the syntax generation component 306 may be designed and implemented specifically for operation with the code scanning system 100 (shown in FIG. 1).

In the exemplary embodiment, the static code analyzer 302 includes a function analyzer 312 configured to evaluate the AST file 310 in conjunction with the source code 108 to identify pure and impure functions. The function analyzer is a special-purpose analysis engine, which is implemented by an arrangement of one or more computer programs (not shown) stored in one or more computer-readable media, such as memory 204 (shown in FIG. 2), that coordinate the overall function of analyzing a computer program (e.g., source code 108) to identify data vulnerabilities. A flowchart of a method for analyzing a computer program, such as the source code 108, is discussed herein with reference to FIG. 4.

The function analyzer 312 may identify pure and impure functions by using, for example, a memory device containing a white list component 314 and/or a memory device containing black list component 316. The white list 314 may contain a list of predetermined pure functions or "side-effect free" functions permitted for use in the source code 108. The pure functions or side-effect free functions may include functions within the source code 108, calls to outside functions or $3^{rd}$-party functions, and/or calls to side-effect free Java functions. In addition, in some embodiments, the white list 314 may include a list of predetermined impure functions or "side-effect" functions, including I/O functions, that are also permitted for use in the source code 108.

The black list 316, in contrast, may contain a list of predetermined impure functions or side-effect functions prohibited for use in the source code 108. The impure functions or side-effect functions may include functions within the source code 108, calls to outside functions or $3^{rd}$-party functions, I/O functions, and/or calls to side-effect Java functions. In addition, in some embodiments, the black list 316 may contain a list of side effects that may have adverse effects concerning the integrity and/or vulnerability of the underlying data used by source code 108. Such side effects may be used as a check against unknown functions, or functions otherwise not listed in the white list 314 or blacklist 316.

Functions and/or side effects not listed in the white list 314 or the black list 316 may be identified and flagged as unknown functions as part of the static analysis of the source code 108. Such unknown functions may be labeled or otherwise identified in the static analysis file 110, and/or permitted or prohibited based on the function's side effects. When the behavior of the unknown functions is subsequently manually identified, the unknown functions may be added to one of the white list 314 or the black list 316.

In some embodiments, the program compiler 318 may receive the source code 108 and/or the code representation 308 from the static code analyzer 302 and compile the code into a computer program.

Figure 4:
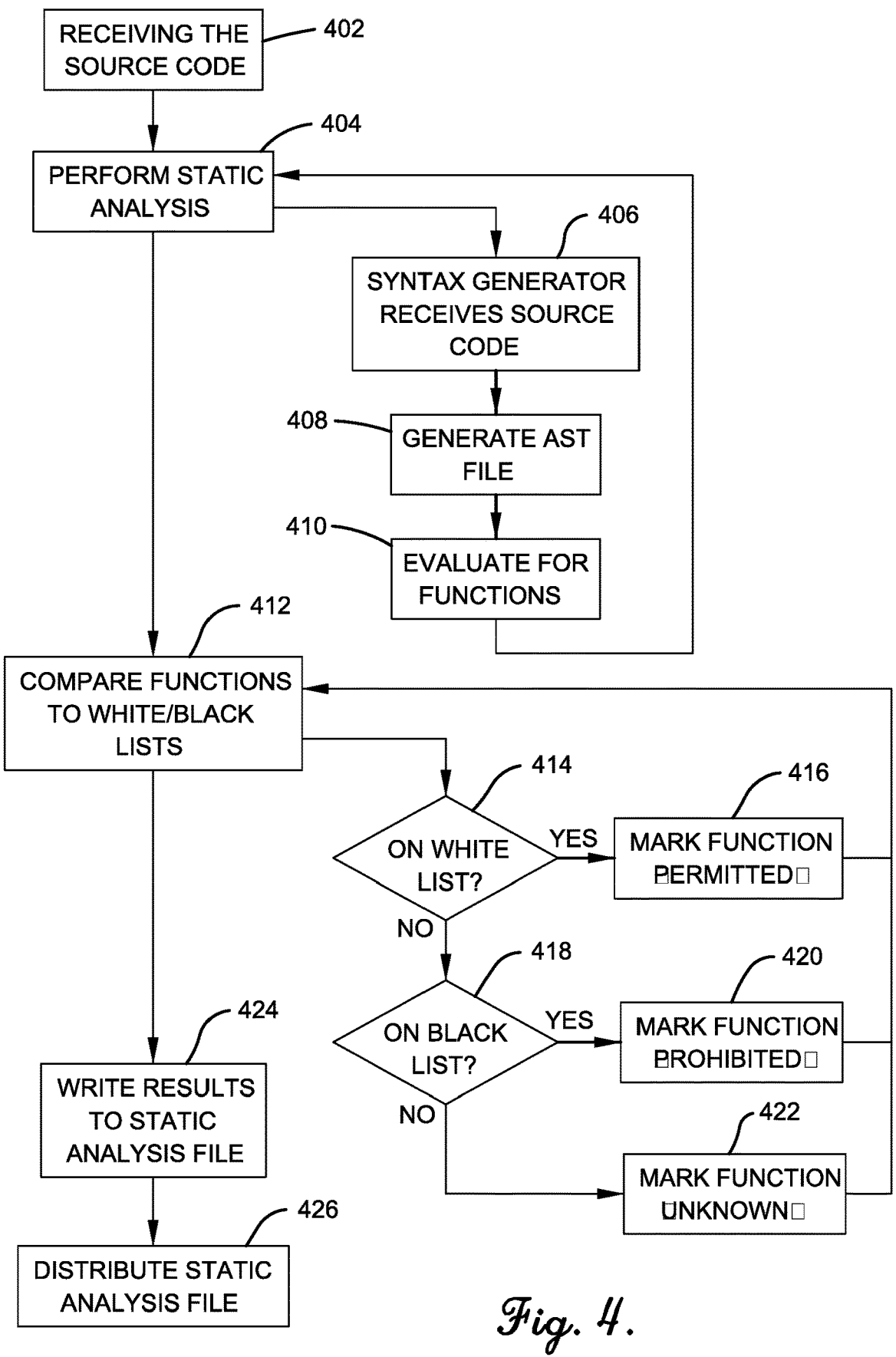
FIG. 4 is a flow diagram of an exemplary method for determining whether computer source code contains impure functions and that may be used with the code scanning system shown in FIG. 1.

Exemplary Computer-Implemented Method for Determining Whether Computer Code Contains Impure Functions FIG. 4 is a flow diagram of an exemplary method 400 for determining whether computer source code contains impure functions and that may be used with the code scanning system 100 (shown in FIG. 1). The method 400 may be at least partially performed by the code scanning computing device 102 (shown in FIG. 1). In certain embodiments, the method 400 may be at least partially performed by another computing device, such as the business product computing device 104 (shown in FIG. 1). However, a person having ordinary skill will appreciate that responsibility for all or some of such actions may be distributed differently among such devices or other computing devices without departing from the spirit of the present invention. The method 400 may include additional, fewer, or alternative operations, including those described elsewhere herein. The various operations or set of operations may be performed in parallel with other operations, either in a synchronous or asynchronous manner. In addition, some operations may be optional.

A computer-readable medium may also be provided. The computer-readable medium may include an executable program stored thereon, wherein the program instructs one or more processors to perform one or more of the operations outlined herein. The program stored on the computer-readable medium may instruct the processor to perform additional, fewer, or alternative actions, including those discussed elsewhere herein.

In the exemplary embodiment, the method 400 is a method by which source code, such as source code 108, is statically scanned and its functions may be identified as pure functions or impure functions. Functions that are pure based on a static analysis are allowed in the source code 108. Impure functions are identified and flagged in the static analysis file 310, and the source code 180 is rejected, that is, the source code is not allowed to be compiled into a computer program.

With respect to FIGS. 1-4, the method 400 may begin with the code scanning computing device 102 receiving 402 the source code 108 from the business product computing device 104. The source code 108 may be, for example, source code implemented in a functional programming language. A functional programming language may be based on a notion of independent functions or processes. A functional process may consume inputs and produce outputs but may not change the state of other memory objects. In the exemplary embodiment, the processes may be rigidly defined as functional processes implemented in functional programming languages such as Clojure, Lisp, and the like. Alternatively, the source code 108 may be coded in a functional programming style even though the programming language may not enforce the functional style. As described herein, in some embodiments, the source code 108 may be source code, intermediate code, decompiled code, or another type of code.

The code scanning computing device 102 may scan the project to identify the source code 108, including external source code that call and are called by the source code 108. This facilitates receiving all source code needed to fully analyze the project. For example, the method 400 may include identifying one or more Clojure projects to be scanned, and specifically, identifying the target version of the source code 108 to be scanned. Each project file of the Clojure project is read to identify the directory trees where the project's Clojure source code files reside for test and non-test source code. The method 400 may include constructing a namespace directed acyclic graph across all the projects. By convention, each Clojure source code file specifies a namespace that is a container of source code, such as source code 108. Every namespace specifies a set of namespace dependencies. The set of namespaces and their namespace dependencies form a directed acyclic graph. The nodes of the graph are namespaces and the edges represent the namespace dependencies. The methods include performing a topological sort of the namespaces across all the projects. A namespace directed acyclic graph allows a topological sort to be easily performed.

The code scanning computing device 102 performs 404 a static analysis of the source code 108. Specifically, the static code analyzer of the code scanning computing device is initialized, where the initial state contains the default white list 314 and black list 316. The white list 314 specifies namespaces, functions, and variables that are deemed pure or "safe" and the black list 316 specifies those that are deemed impure or "unsafe." Each of the namespaces is scanned in topological order and the results are accumulated and written to a static analysis file.

The syntax generation component 306 receives 406 the source code 108 and generates 408 the AST file 310, i.e., an abstract syntax tree (AST) representation of the source code 108. The AST file 310 and/or the source code 108 is transmitted to the static code analyzer 302, where the AST file 310 and/or source code 108 is evaluated 410 to automatically identify one or more functions within the source code 108 and/or AST file 310. For example, the syntax generation component 306 analyzes the namespace to read, parse, and transform the Clojure source code file into the AST file 310. An AST syntax tree is a tree representation of the abstract syntactic structure of source code 108 written in a programming language (e.g., Clojure). The syntax generation component 306 performs a depth first traversal of the namespace's AST file. The AST file contains the namespace's imports, definitions of functions, definitions of variables, and function execution expressions.

The function analyzer 312 may identify pure and impure functions by comparing 412 the identified functions to the white list 314 and/or the black list 316. At 414, if the identified function is on the white list 314, the function may be classified or marked 416 as "permitted." At 414, if the identified function is not on the white list 314, it is checked against the black list 316. At 418, if the identified function is on the black list 316, the function may be classified or marked 420 as "prohibited." Again, at 418, if the identified function is not on the black list 316, the function is classified or marked 422 as "unknown." Functions classified or marked as "unknown" may be subject to manual analysis. Manual analysis may place the functions on the white list 314 or the black list 316 and may include, for example, human analysis and classification. Specifically, for example, if at least one of the namespace's imports is on the black list 316, the current namespace is added to the black list 316. If all of the namespace's imports are on the white list 314, the current namespace is added to the white list 314. Otherwise, the current namespace is added to the black list 316.

The depth first traversal visits each node of the AST file to identify if a particular function or variable definition contains one or more execution calls to a function or variable referenced on the black list 316, white list 314, or neither of the lists. If a definition contains at least one execution call or variable reference to the black list 316, the current definition is added to the black list 316. If all of the execution calls and variable references are to the white list 314, the current definition is added to the white list 314. Otherwise, the current definition is added to the black list 316.

The depth first traversal also visits each node of the AST file to identify if a particular execution expression contains one or more execution calls to a function or variable referenced on the black list 316, white list 314, or neither of the lists. If an execution expression contains at least one execution call or variable reference to the black list 316, the current namespace is added to the black list 316. If all of the execution calls and variable references are to the white list 314, the current namespace is added to the white list 314. Otherwise, the current namespace is added to the black list 316.

After each of the identified functions is compared to the white list 314 and the black list 316, the results of the static analysis, e.g., the statistics for each node of the AST tree, are collected and written 424 to the static analysis file 110. The static analysis file 110 may be subsequently distributed 426 to the user 210 for review. For example, in one embodiment, the static analysis file 110 may be transmitted to the business product computing device 104 and/or stored in the memory device 304. In some embodiments, the source code 108 and/or the code representation 308 may be compiled into a computer program.

The static analysis file 110 may include a Pass/Fail indication with a score that can be used as a hard control to fail or pass the source code 108. In addition, the static analysis file 110 may include location information where a particular function may be found in the source code 108. For example, and without limitation, a file name, a line number, and the like. Moreover, the static analysis file 110 may be stored in a database and utilized to compare the results of a static analysis with a previous static analysis, and highlight the differences between the new static analysis and the previous analysis.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As will be appreciated based upon the foregoing disclosure, the above-described embodiments may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Certain embodiments are described herein as including logic or a number of routines, subroutines, applications, or instructions. These may constitute either software (e.g., code embodied on a machine-readable medium or in a machine-readable signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as an FPGA, to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the terms "processor," "processing element," or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A code scanning system for scanning source code for data vulnerabilities, said system comprising:
   a code scanning computing device comprising:
      a syntax generation component that:
         receives the source code; and
         generates a code representation that represents a data structure of the source code;
      a memory device comprising a white list having a list of predetermined pure functions permitted for use in the source code, and a black list having a list of predetermined impure functions prohibited for use in the source code; and
      a static code analyzer for performing a static analysis of the source code, said static code analyzer comprising a function analyzer that:
         receives the code representation from said syntax generation component;
         evaluates the code representation to identify one or more functions of the source code;
         compares each function of the one or more functions to said white list, and if the function is on said white list, mark the function as permitted in a static analysis file;
         compares each function of the one or more functions to said black list if the function is not on said white list, and if the function is on said black list, mark the function as prohibited in the static analysis file; and
         marks each function of the one or more functions as unknown in the static analysis file if the function is not on said white list or said black list.

2. The code scanning system of claim 1, further comprising a program compiler that:
   receives the source code from said static code analyzer; and compiles the source code into a computer program.

3. The code scanning system of claim 1, further comprising a memory device that stores the code representation and the static analysis file.

4. The code scanning system of claim 1, wherein the code representation is an abstract syntax tree (AST) representation.

5. The code scanning system of claim 1, further comprising a communication interface coupled in communication to said syntax generation component, said communication interface receives the source code and transmits the static analysis file to one or more remote devices.

6. The code scanning system of claim 1, further comprising one or more business product computing devices including the source code.

7. The code scanning system of claim 1, wherein said white list further includes a list of one or more of the following: predetermined impure functions, "side-effect" functions, and input/output (I/O) functions, that are permitted for use in the source code.

8. The code scanning system of claim 1, wherein the source code is written in a functional language.

9. The code scanning system of claim 8, where the functional language is Clojure.

10. A computer-implemented method for determining whether source code contains impure functions, said method comprising:
    receiving the source code;
    generating a code representation including a data structure representing the source code; and
    performing a static analysis of the source code comprising:
        identifying one or more functions of the source code;
        comparing each function of the one or more functions to a white list, and if the function is on the white list, classifying the function as a pure function;
        comparing each function of the one or more functions to a black list if the function is not on the white list, and if the function is on the black list, classifying the function as an impure function; and
        classifying each function of the one or more functions as unknown if the function is not on the white list or the black list.

11. The computer-implemented method of claim 10, wherein the code representation is an abstract syntax tree (AST) representation.

12. The computer-implemented method of claim 10, wherein identifying one or more functions of the source code comprises evaluating the code representation.

13. The computer-implemented method of claim 10, further comprising compiling the source code into a computer program.

14. The computer-implemented method of claim 10, wherein receiving the source code comprises receiving source code written in a functional language.

15. The computer-implemented method of claim 14, wherein the functional language is Clojure.

16. A computer-readable medium having computer-executable instructions, which upon execution by a processor, cause the processor to perform operations comprising:
    receiving the source code;
    generating a code representation including a data structure representing the source code; and
    performing a static analysis of the source code comprising:
        identifying one or more functions of the source code;
        comparing each function of the one or more functions to a white list, and if the function is on the white list, classifying the function as a pure function;
        comparing each function of the one or more functions to a black list if the function is not on the white list, and if the function is on the black list, classifying the function as an impure function; and
        classifying each function of the one or more functions as unknown if the function is not on the white list or the black list.

17. The computer-readable medium of claim 16, wherein the code representation is an abstract syntax tree (AST) representation.

18. The computer-readable medium of claim 16, wherein identifying one or more functions of the source code comprises evaluating the code representation.

19. The computer-readable medium of claim 16, wherein receiving the source code comprises receiving source code written in a functional language.

20. The computer-readable medium of claim 19, wherein the functional language is Clojure.

* * * * *